Feb. 14, 1933. T. MUNRO 1,897,272
SPRING COVER
Filed March 18, 1929
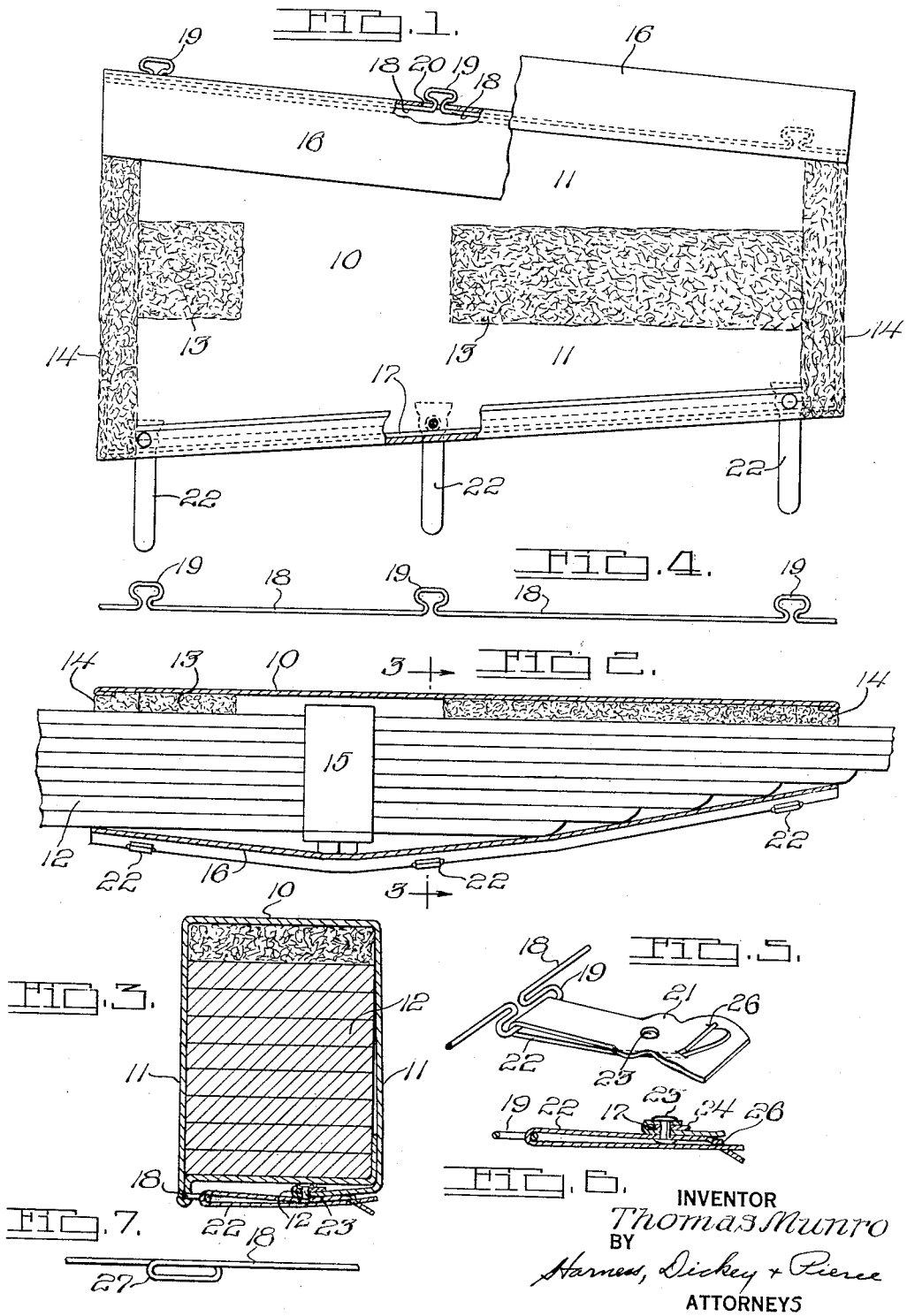

Patented Feb. 14, 1933

1,897,272

UNITED STATES PATENT OFFICE

THOMAS MUNRO, OF PHILADELPHIA, PENNSYLVANIA

SPRING COVER

Application filed March 18, 1929. Serial No. 347,830.

This invention relates to covers for the springs of motor vehicles, and particularly to a new and novel construction for easily and quickly securing such covers in place on a spring.

The object of the present invention is to provide a new and novel means for securing spring covers in place on a vehicle spring, which means will be economical to manufacture, and efficient in use.

Another object is to provide a fastening means for spring covers comprising a wire having loops formed therein secured to one edge of the spring cover, and corresponding bendable tongue members secured to the opposite edge of the cover and adapted to cooperate with their corresponding loops to hold the cover against displacement.

Another object is to form the device above described in which the bendable member is provided with a slot in which the return bent end of the member may be inserted after passing through its corresponding loop, whereby to prevent possible displacement of the member.

Another object is to provide, in combination with a spring cover having a yieldable stress transmitting member at one edge thereof, loops formed in the member, and bendable fastening members secured to the opposite edge of the spring cover in position to cooperate with the loops whereby to form a fastening means for the cover.

A further object is to provide a fastening means for vehicle spring covers including certain novel features of construction hereinafter apparent.

The above being among the objects of the present invention, the same consists in certain features of construction and combinations of parts to be hereinafter described with reference to the accompanying drawing, and then claimed, having the above and other objects in view.

In the accompanying drawing which shows a suitable embodiment of the present invention, and in which like numerals refer to like parts throughout the several different views;
Fig. 1 is a more-or-less diagrammatic partially broken plan view of the inside of a spring cover spread out in flat condition.

Fig. 2 is a fragmentary side view of a vehicle spring provided with a spring cover, the latter being shown in vertical section.

Fig. 3 is a vertical sectional view taken on the line 3—3 of Fig. 2.

Fig. 4 is a view of the flexible wire edge stress transmitting member employed in the spring cover shown in the previous views and which is formed to provide fastening loops.

Fig. 5 is a perspective view showing the manner in which one of the fastening members cooperates with its corresponding loop to secure the spring cover in position upon a spring.

Fig. 6 is a sectional view of the fastener shown in Fig. 5, but including additional parts engaged by a rivet.

Fig. 7 is a fragmentary view of a modified form of looped edge stress transmitting member.

As is commonly known, covers are provided for vehicle springs in order to prevent the entrance of dust, dirt or other foreign matter to the springs, and such covers are also generally provided in whole or part with a lining which is adapted to absorb and retain lubricant for the springs enclosed thereby. The conventional method of securing a cover in place on a vehicle spring is to provide eyelets in the free edges of the cover through which a shoe string is threaded in the usual manner. This method is more-or-less unsatisfactory due to the length of time necessary to apply the cover to or remove it from a spring, and also because the fabric from which the shoe strings are made is subject to wear due to the rubbing action which occurs during the flexing of the spring.

In my United States Patent 1,667,735 dated May 1, 1928, I have shown a means for securing spring covers in place without the use of the conventional form of fastening means, and while such form of fastening means is entirely satisfactory, I have found it possible, in accordance with the present invention, to produce a satisfactory fastening means at a much less cost, and one which overcomes the disadvantages of the conventional form of fastening means as outlined above.

Referring to the accompanying drawing, I show a spring cover formed of a single sheet of rubberized fabric, or other suitable material preferably impervious to grease, and formed to provide a cover having a top 10 and sides 11 which are adapted to embrace the top and sides of a conventional vehicle spring such as 12 shown in Figs. 2 and 3. The inner surface of the top 10 is shown as being provided with a layer of felt or other lubricant absorbing material 13, and which material may obviously be extended over the full area of the sides 11 if desired, but which, in the present case, is extended only over the top of the spring 12 and for a short distance as at 14 at each end of the cover in order to effect a suitable seal at such ends. The layer 13 may be cut away in the neighborhood of the spring clip 15 as indicated in order to provide clearance for the same so as to eliminate the bulge on the surface of the cover which would otherwise occur. The cover shown is provided with an integral flap 16 adapted to cover the lower face of the spring 12, but it will be apparent that this flap 16 may be formed of a piece separate from the main body portion 12 and thereafter secured to the body portion 12, or it may be entirely eliminated if desired, as is found to be quite satisfactory. The material at the lower edges of the sides 11 is turned back on itself and sewed and such edges are provided with a flexible spring wire member 17 and 18 respectively, these members being for the same purpose as that described in connection with the above identified patent and acting as a flexible and yieldable member for maintaining the lower edges of the sides 11 in place when urged towards each other by the fastening members. The employment of the flexible wire members 17 and 18 has been taken advantage of in the present invention in order to provide a novel form of fastening means for the cover, and this is accomplished in the following manner:

The wire member 18 is formed to provide a plurality of spaced outstanding loops such as 19 thereon, and the rebent edge of the cover which receives the wire is cut out as at 20 in line with the various loops 19 so as to allow the same to extend therethrough so as to be exposed on the exterior of the completed cover. To the opposite edge of the cover and in transverse alignment with the various loops 19 I secure a fastening member comprising a base-like portion 21 and an extending tongue portion 22 by means of rivets such as 23, or other suitable means. The rivets 23 are preferably inserted through the fabric of the corresponding side at the point where such fabric is reversely bent and preferably immediately back of the wire 17 from the edge, so that any pressure on the member 21 is transmitted to the wire 17 instead of directly to the fabric. I also prefer to insert a re-enforcement fabric strip 24 of webbing or other like material between the reversely bent edges of the side 11 in which the wire 17 is inserted, so as to reinforce such edge against tearing out of the rivet.

In practice, the cover is applied in position on the spring as indicated in Figs. 2 and 3 and the end of each tongue 22 is then passed through its corresponding loop 19 on the wire 18, the wires 17 and 18 are drawn together with sufficient pressure to bring the cover snugly against the spring, and then each tongue 22 is bent back on itself, thus securing the cover in place. In order to prevent the free end of the tongue 22 from becoming displaced from its operative position, I prefer to form a transverse slot 25 in the body portion 21 on that side thereof opposite the corresponding loop 19, and insert the free end of the tongue 22 through the slot, and in order to facilitate the entrance of the tongue 22 into the slot 25 I turn the metal at the edge of the slot 25 upwardly as at 26 in order to guide the free end of the tongue 22 into the slot 25.

The metal from which the member 21 and tongue 22 are formed is relatively immaterial as long as the metal is sufficiently ductile to allow ready bending of the tongue 22. Likewise the manner in which the loops 19 are formed in the wire 18 is relatively immaterial, and it will be quite apparent that such loops may be formed as at 27 in Fig. 7 if desired, without materially affecting the present invention.

The ease with which a cover may be applied to the spring when employing the construction provided by the present invention is readily apparent, and I have described the loops 19 as being formed in a flexible wire member 18, I have done this because I prefer to employ such flexible wire member 18 for the purpose of more securely holding the edges of the cover against the spring, and also because the members 17 and 18 may flex and give during flexing of the vehicle spring without subjecting the fastening members to undue stresses.

Formal changes may be made in the specific embodiment of the invention described without departing from the spirit or substance of the broad invention, the scope of which is commensurate with the appended claims.

What I claim is:

1. In combination, in a spring cover, a flexible spring member secured in one edge thereof, loops formed in said member, and fastening members secured to the opposite side of said cover, said fastening members each in the form of a bendable metallic tongue engageable with one of said loops and each provided with a transverse slot adapted to receive the rebent end thereof.

2. In combination, in a spring cover, an elastic metal wire secured in each edge of said cover, one of said wires being bent to form a plurality of spaced loops projecting from said cover, and fastening members secured adjacent to the wire at the opposite edge of said cover, said fastening members each being provided with an extended tongue cooperable with a corresponding loop to secure said cover upon a vehicle spring and a body portion through which extends a rivet and said body portion being provided with a slot, beyond said rivet to receive the free end of the tongue.

3. For use in combination with a cover having a relatively stiff elastic member secured in one edge thereof and providing a plurality of spaced loops, bendable metal fastening members adapted to be secured to the opposite edge of said cover in transverse alignment with said loops, said fastening members each being formed of sheet metal and each comprising a portion secured to said last mentioned edge and an extended bendable tongue adapted to be received in the corresponding of said loops, said secured portion being apertured to receive the end of said tongue after insertion through said loop.

4. In combination, in a spring cover, relatively stiff elastic wires secured in opposite edges thereof, one of said wires being provided with a plurality of spaced loops, fastening members secured to and by a reinforcing strip adjacent the wire at one edge of said cover and in transverse alignment with said loops, said fastening members each comprising an enlarged portion secured to said edge by a rivet engaging the wire and reinforcing strip therein and comprising also an extended bendable tongue adapted to be received in the corresponding loop at the other edge of said cover, said enlarged portion being apertured to receive the end of said tongue after insertion through said loop and the metal at the edge of said aperture being struck outwardly at an angle to said portion whereby to form a guide for directing the end of said tongue into said aperture.

THOMAS MUNRO.